United States Patent
Yi et al.

(10) Patent No.: US 9,445,261 B2
(45) Date of Patent: Sep. 13, 2016

(54) METHOD AND APPARATUS FOR REPORTING MEASUREMENT RESULT

(75) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 13/981,079

(22) PCT Filed: Apr. 27, 2012

(86) PCT No.: PCT/KR2012/003313
§ 371 (c)(1),
(2), (4) Date: Jul. 22, 2013

(87) PCT Pub. No.: WO2012/148229
PCT Pub. Date: Nov. 1, 2012

(65) Prior Publication Data
US 2013/0303129 A1 Nov. 14, 2013

Related U.S. Application Data

(60) Provisional application No. 61/479,827, filed on Apr. 27, 2011.

(51) Int. Cl.
*H04W 12/02* (2009.01)
*H04W 24/10* (2009.01)
*H04W 24/00* (2009.01)

(52) U.S. Cl.
CPC ............. *H04W 12/02* (2013.01); *H04W 24/10* (2013.01); *H04W 24/00* (2013.01)

(58) Field of Classification Search
None
See application file for complete search history.

(56) References Cited

U.S. PATENT DOCUMENTS

| | | | |
|---|---|---|---|
| 5,749,053 A * | 5/1998 | Kusaki et al. | 455/524 |
| 2004/0198294 A1* | 10/2004 | Hagin-Metzer | 455/296 |
| 2010/0054135 A1* | 3/2010 | Rahman et al. | H04W 76/041 370/242 |
| 2010/0190488 A1 | 7/2010 | Jung et al. | |
| 2010/0330921 A1 | 12/2010 | Kim et al. | |
| 2011/0276838 A1* | 11/2011 | Zhou et al. | 714/45 |
| 2012/0039189 A1* | 2/2012 | Suzuki et al. | H04W 24/10 370/252 |
| 2012/0208503 A1* | 8/2012 | Johansson | 455/411 |
| 2013/0090113 A1* | 4/2013 | Persson et al. | 455/424 |
| 2013/0267238 A1* | 10/2013 | Hapsari et al. | 455/450 |
| 2014/0248868 A1* | 9/2014 | Wang et al. | 455/422.1 |

OTHER PUBLICATIONS

3GPP TS 37.320 V2.0.0, Radio measurement collection for Minimization of Drive Tests (MDT); Overall Description; Stage 2 (Release 10), Nov. 2010.*

(Continued)

*Primary Examiner* — Lester Kincaid
*Assistant Examiner* — Daniel G Bassett
(74) *Attorney, Agent, or Firm* — Dentons US LLP (57) ABSTRACT

A method and apparatus for reporting measurement results in a wireless communication system is provided. A user equipment receives a measurement configuration from a base station and logs a measurement result based on the measurement configuration. The user equipment determines whether a consent for reporting privacy information is revoked while logging the measurement result. If the consent is revoked, the user equipment stops logging the measurement result.

10 Claims, 7 Drawing Sheets

(56) References Cited

OTHER PUBLICATIONS

3GPP TS 36.331 V10.0.0, Evolved Universal Terrestrial Radio Access (E-UTRA); Radio Resource Control (RRC); Protocol specification (Release 10), Jan. 2011.*
Ali-Yahiya, T "Understanding LTE and its Performance" 2011 Springer pp. 20-21.*
3GPP, Radio measurement collection for Minimization of Drive Tests (MDT), Dec. 21 2010, TS 37.320 V10.0.0.*
3GPP TSG RAN WG2 #69, R2-101141, MDT Configuration for logging in idle mode, Feb. 16, 2010, see pp. 1-2.
3GPP TS 37.320 V1.0.0., Radio measurement collection for Minimization of Drive Tests (MDT): Overall description: Stage 2 (Release 10), Sep. 22, 2010, see paragraph 3-paragraph 5.
Nokia Siemens Networks, Nokia Corporation:, "Introduction of Minimization of Drive Tests", 3GPP TSG-RAN WG2 Meeting #72, R2-106931, Nov. 15-19, 2010.
LG Electronics Inc.: "Issues in MDT User Consent", 3GPP TSG-RAN WG2 Meeting #74, R2-113246, May 9-13, 2011.
Pantech: "MDT user consent revocation considerations", 3GPP TSG-RAN WG2 Meeting #73bis, R2-112265, Apr. 11-15, 2011.
NEC: "Disc on enforcement of user consent", 3GPP TSG-RAN2 Meeting #72bis, R2-110048, Jan. 17-21, 2011.

* cited by examiner

METHOD AND APPARATUS FOR REPORTING MEASUREMENT RESULT

This Application is a 35 U.S.C. §371 National Stage Entry of International Application No. PCT/KR2012/003313, filed Apr. 27, 2012 and claims the benefit of U.S. Provisional Application No. 61/479,827, filed Apr. 27, 2011, all of which are incorporated by reference in their entirety herein.

TECHNICAL FIELD

The present invention relates to wireless communications, and more particularly, to a method and apparatus for reporting a measurement result in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by operators for coverage optimization by using a user equipment (UE) instead of using an automobile. A coverage varies depending on a location of a base station (BS), deployment of buildings nearby, a user's usage environment, etc. Therefore, it is required for the operators to periodically perform the driving test, and a lot of costs and resources are consumed. The MDT is used when the operator measures the coverage by using the UE.

The MDT can be classified into a logged MDT and an immediate MDT. According to the logged MDT, after performing the MDT measurement, the UE delivers a logged measurement to a network available at a time of a reporting condition. According to the immediate MDT, after performing the MDT measurement, the UE delivers the measurement to the network when a configured reporting condition is satisfied. The logged MDT performs the MDT measurement in a radio resource control (RRC) idle mode, but the immediate MDT performs the MDT measurement in an RRC connected mode.

For the MDT measurement, the UE consumes a battery, and an available memory may decrease. Since the UE further performs an additional operation, a user's prior consent for performing the MDT may be essential.

However, even if the user has a prior consent for the MDT measurement, occasionally, the user may not want to report privacy information of the user to a network. For both of the immediate MDT and the logged MDT, location information of the UE is included in a measurement result. Since this is related to user's privacy, occasionally, it may be necessary for the user not to report location information of the user to the network.

However, there is a need for a method capable of guaranteeing the user's privacy when reporting the measurement result.

SUMMARY OF INVENTION

Technical Problem

The present invention provides a method and apparatus for reporting measurement results in a wireless communication system.

Technical Solution

In an aspect, a method for reporting measurement results in a wireless communication system is provided. The method includes receiving a measurement configuration from a base station, logging a measurement result based on the measurement configuration, the measurement result including at least one log entry, the at least one log entry including a measured cell quality of a serving cell, a measured cell quality of a neighbor cell and privacy information of the UE, determining whether a consent for reporting privacy information is revoked while logging the measurement result, and if the consent is revoked, stop logging the measurement result.

The privacy information may include location information of the UE at the moment of logging.

The measurement configuration may include a logging interval indicating a periodicity for measurement logging and a logging duration indicating a duration for which UE is requested to perform measurement logging.

The measurement configuration may be used to configure the UE to perform Minimization of driving tests (MDT).

In another aspect, a user equipment (UE) for reporting measurement results in a wireless communication system includes a radio frequency unit for receiving a radio signal, and a processor, operably coupled with the radio frequency unit, configured to receive a measurement configuration from a base station, log a measurement result based on the measurement configuration, the measurement result including at least one log entry, the at least one log entry including a measured cell quality of a serving cell, a measured cell quality of a neighbor cell and privacy information of the UE, determining whether a consent for reporting privacy information is revoked while logging the measurement result, and if the consent is revoked, stop logging the measurement result.

Advantageous Effects

User's privacy can be protected in a process of reporting a measurement result including location information.

MODE FOR INVENTION

Figure 1:
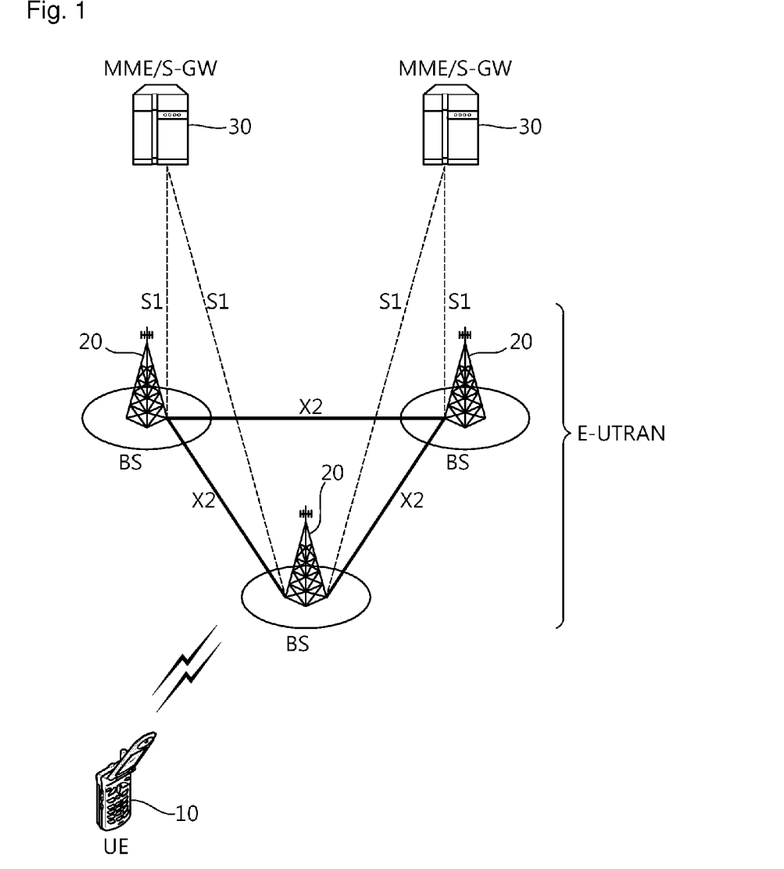
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
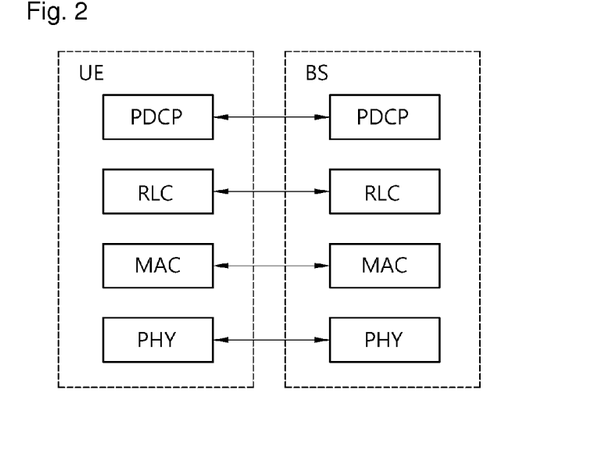
FIG. 2 is a diagram showing a radio protocol architecture for a user plane.
Figure 3:
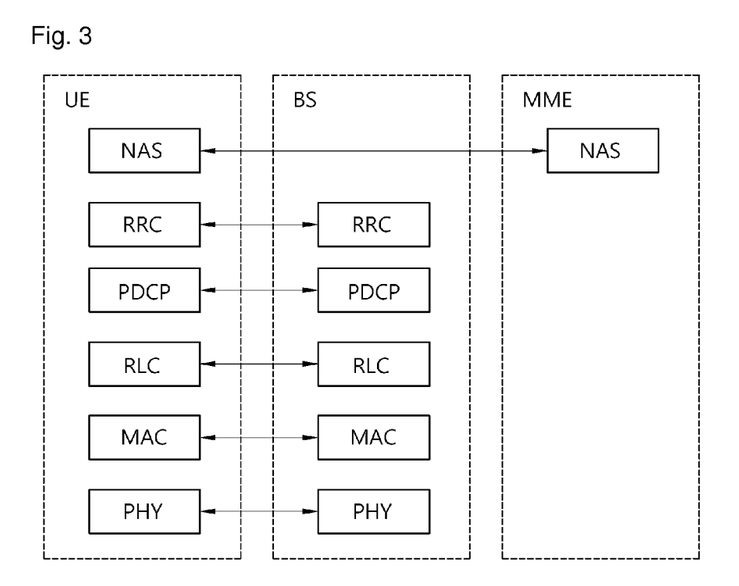
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Now, minimization of driving tests (MDT) will be described.

The MDT is a test performed by an operator for coverage optimization by using a UE instead of using an automobile. A coverage varies depending on a location of a BS, deployment of buildings nearby, a user's usage environment, etc. Therefore, it is required for the operator to periodically perform the driving test, and a lot of costs and resources are consumed. The MDT is used by the operator to optimize a network by using the UE.

MDT is built upon the framework of trace function that is one of operator's tools for Operation, Administration, and Maintenance (OAM). The trace function provides the operators with the capability to track and log UE activities such that it can enable the determination of the root cause of the malfunctions at UE. The traced data is collected in a network node, called Trace Collection Entity (TCE). Operator uses the data collected in TCE for analysis and evaluation. The trace function used for MDT includes signaling based trace function and management based trace functions. Signaling based trace function is used to activate MDT task towards a specific UE, while management based trace function is used to activate MDT task without specifying any particular UE.

Which UE will be used in the MDT measurement depends on an operator's decision. However, the operator can use only a UE which has a prior consent for performing of the MDT in the MDT measurement. The UE's prior consent for performing of the MDT can be determined by the user by using a radio protocol layer, a Non-Access Stratum (NAS) layer, a web, an application, etc.

The MDT can be classified into a logged MDT and an immediate MDT. According to the logged MDT, after performing the MDT measurement, the UE delivers a logged measurement to a network at a particular time. According to the immediate MDT, after performing the MDT measurement, the UE delivers the measurement to the network when a reporting condition is satisfied. The logged MDT performs the MDT measurement in a radio resource control (RRC) idle mode, and the immediate MDT performs the MDT measurement in an RRC connected mode.

An MDT configuration for the immediate MDT includes a location indicator which indicates reporting of location information and a 'reportAmount' field which reports how many times a corresponding MDT measurement will be performed. The UE measures a radio environment in the RRC connected mode, and reports a measurement result by the number corresponding to the reportAmount to a BS. The measurement result includes location information of the UE, serving cell quality, and neighboring cell quality.

Figure 4:
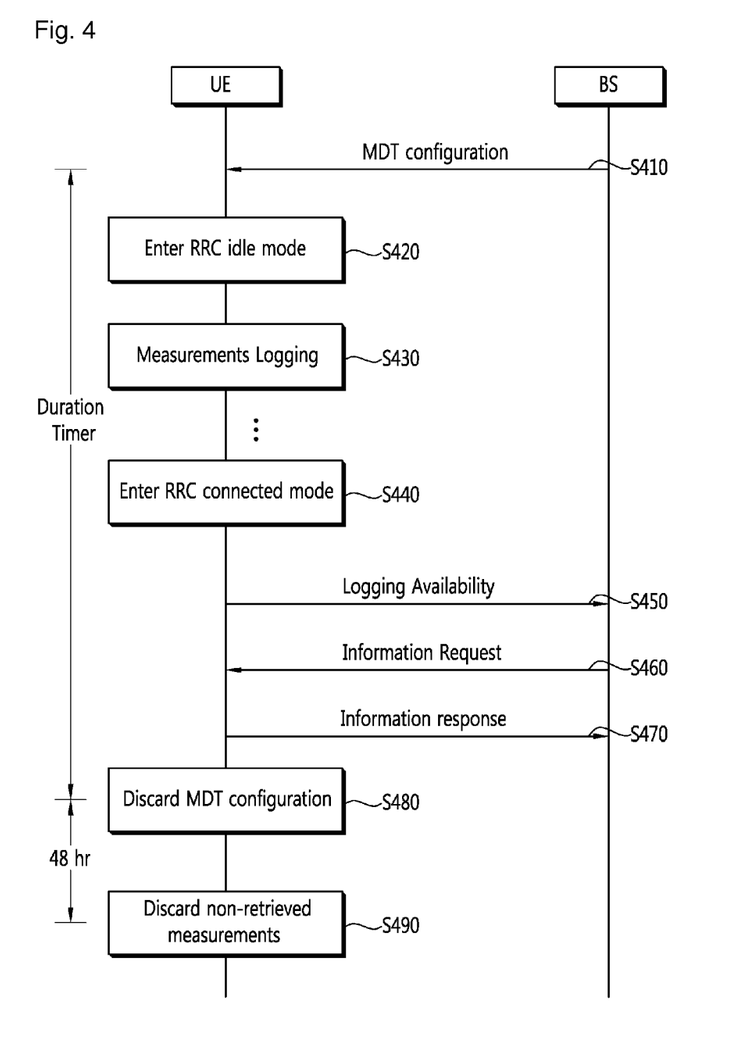
FIG. 4 shows a process of performing a logged MDT.

FIG. 4 shows a process of performing a logged MDT.

A UE receives an MDT configuration from a BS (step S410). The UE is in an RRC connected mode in which an RRC connection to a serving cell is established. The MDT configuration may include at least one of a logging interval, a reference time, an area configuration, and a logging duration. The logging interval indicates a periodicity for an MDT measurement. The reference time is a reference time when the MDT measurement is stored. The UE stores a difference between the reference time and a current time of the MDT measurement. The area configuration indicates an area in which the UE performs MDT logging. The logging duration indicates a duration in which the MDT measurement is performed, and is a value of a duration timer.

As the MDT configuration is received, the UE starts the duration timer. The duration timer indicates a lifetime of the MDT configuration. When the UE receives the MDT configuration, the UE sets the value of the duration timer to the logging duration, and starts the duration timer.

The UE enters an RRC idle mode (step S420). Even if the UE transitions to the RRC idle mode, the MDT configuration is maintained.

The UE performs measurement logging on the basis of the MDT configuration while the duration timer is running (step S430). For example, the MDT measurement is performed for every logging interval included in the MDT configuration and the measurement result is stored. The MDT measurement result includes one or more log entries. Logging of the MDT measurement may imply a process of storing the log entry into a memory of the UE.

The log entry may include any one of a serving cell's identifier, a measured cell quality of a serving cell, a measured cell quality of a neighbor cell, a time stamp, and privacy information. The time stamp may indicates the moment of logging. The privacy information may include location information of the UE at the moment of logging. The cell quality may be represented as a value well-known to those ordinary skilled in the art, such as reference signal received power (RSRP), reference signal received quality (RSRQ), received signal code power (RSCP), and Ec/No.

The UE re-enters the RRC connected mode (step S440). As the UE re-enters the RRC connected mode, the UE sends a logging availability to the BS (step S450). The UE can send the logging availability to a network when the RRC connection is established, the RRC connection is reestablished, or the RRC connection is reconfigured. The logging availability may be a 1-bit indicator indicating whether there is a stored MDT measurement.

The BS can send an information request to the UE to request reporting of the logged measurement on the basis of the availability indicator (step S460). The UE can send an information response including the logged measurement to the BS (step S470).

At the expiry of the duration timer, the UE discards the MDT configuration, and stops logging of the MDT measurement (step S480). The logged measurement which is not yet retrieved by the BS is maintained. After 48 hours elapse, the remaining logged measurements are discarded (step S490).

When a new MDT configuration is received while the duration timer is running, the MDT configuration is updated to the new MDT configuration, and the duration timer is restarted. Further, the logged MDT measurement is discarded according to the previously configured MDT configuration.

For the MDT measurement, the UE consumes a battery, and an available memory may decrease. Since the UE further performs an additional operation, a user's prior consent for performing the MDT may be essential.

However, even if the user has a prior consent for the MDT measurement, occasionally, the user may not want to report privacy information of the user to a network. For both of the immediate MDT and the logged MDT, location information of the UE is included in a measurement result. Since this is related to user's privacy, occasionally, it may be necessary for the user not to report location information of the user to the network.

However, there is a need for a method capable of guaranteeing the user's privacy when performing the MDT measurement.

According to the present invention, even if the user has a prior consent for the MDT measurement, the consent for the MDT measurement is revoked when the user does not want to open privacy information, and thus user's privacy information is not transmitted to the network by a radio protocol.

Figure 5:
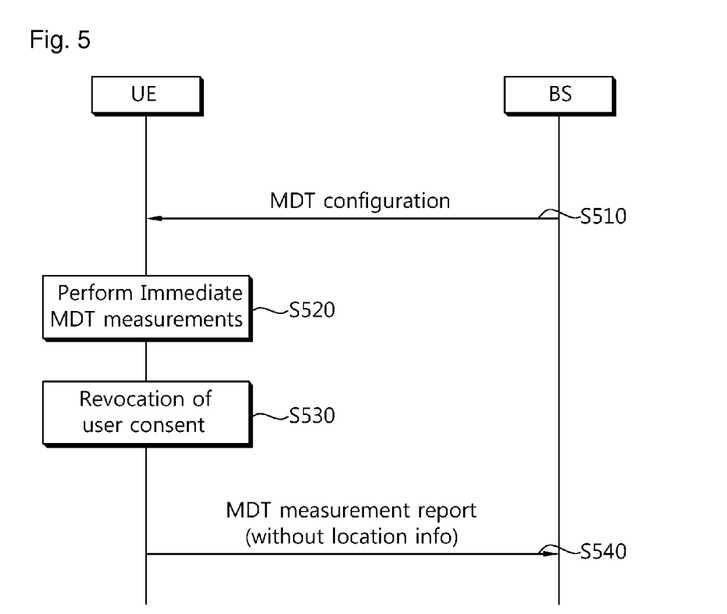
FIG. 5 is a flowchart showing an MDT measurement according to an embodiment of the present invention.

FIG. 5 is a flowchart showing an MDT measurement according to an embodiment of the present invention.

A UE receives an MDT configuration for an immediate MDT from a BS (step S510). The UE performs the immediate MDT on the basis of the MDT configuration (step S520). An MDT measurement result transmitted by the UE to the BS includes privacy information of the UE.

A user of the UE revokes an MDT consent while the immediate MDT is performed (step S530). The revocation can be reported by a non-access stratum (NAS) of the UE to an RRC layer of the UE.

When the consent is revoked, the UE excludes the privacy information from the MDT measurement result and then reports the resultant result (step S540).

Figure 6:
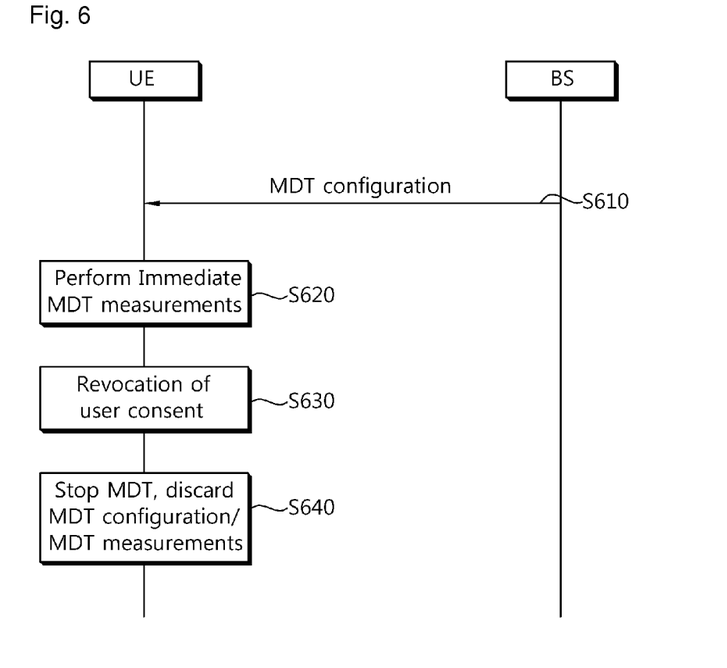
FIG. 6 is a flowchart showing an MDT measurement according to another embodiment of the present invention.

FIG. 6 is a flowchart showing an MDT measurement according to another embodiment of the present invention.

A UE receives an MDT configuration for an immediate MDT from a BS (step S610). The UE performs the immediate MDT on the basis of the MDT configuration (step S620). A user of the UE revokes an MDT consent while the immediate MDT is performed (step S630). The revocation can be reported by an NAS of the UE to an RRC layer of the UE.

When the consent is revoked, the UE stops the MDT measurement (step S640). The UE can discard any one of the MDT configuration and the MDT measurement result.

Figure 7:
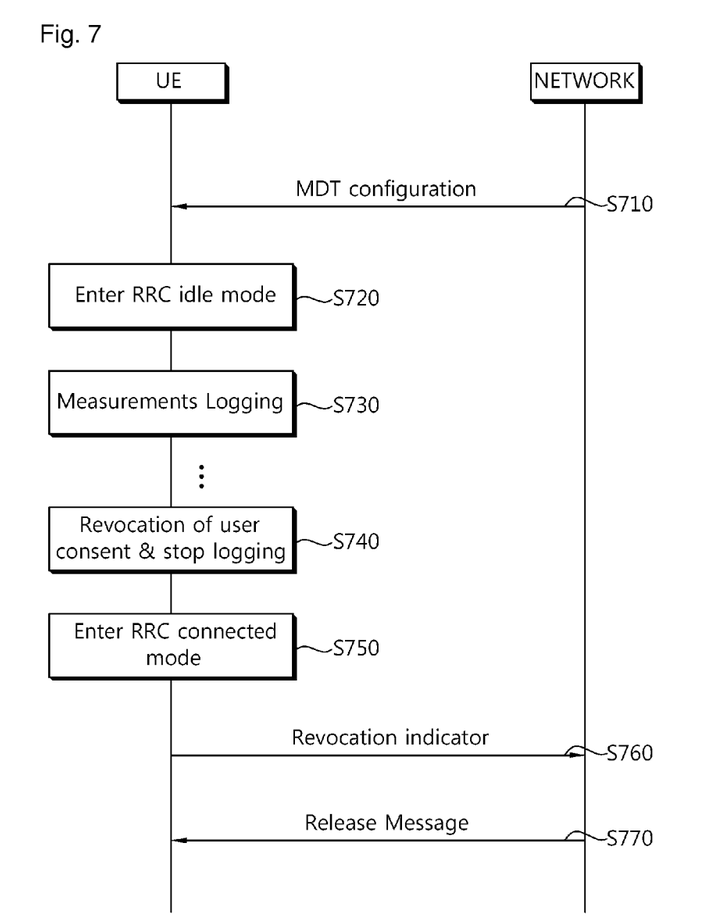
FIG. 7 is a flowchart showing an MDT measurement according to another embodiment of the present invention.

FIG. 7 is a flowchart showing an MDT measurement according to another embodiment of the present invention.

A UE receives an MDT configuration for a logged MDT from a BS (step S710). As the MDT configuration is received, the UE can start a duration timer.

The UE enters an RRC idle mode (step S720). The UE performs measurement logging on the basis of the MDT configuration while the duration timer is running (step S730).

A user of the UE revokes an MDT consent while the logged MDT is performed (step S740). The revocation can be reported by an NAS of the UE to an RRC layer of the UE. When the consent is revoked, the MDT measurement stops, and the duration timer may stop.

The UE re-enters the RRC connected mode (step S750). As the UE re-enters the RRC connected mode, the UE sends a revocation indicator to the BS (step S760). The revocation indicator may indicate a revocation of a user consent. Alternatively, the revocation indicator may indicate a deletion of user's privacy information. The UE can send the revocation indicator to a network when the RRC connection is established, the RRC connection is reestablished, or the RRC connection is reconfigured. The revocation indicator can be sent to the network by using an RRC message or an NAS message.

When the revocation of the consent of the UE is delivered, the BS can send a release message for stopping or releasing the logged MDT to the UE (step S770). The release message may be the RRC message. For example, the BS may send a new MDT configuration in which a logging duration is set to a specific value (e.g., 0) to the UE as the release message. When the new MDT configuration is received, the UE discards the previous MDT configuration. Then, if the logging duration is 0, the MDT measurement is not performed since the duration timer does not run.

Figure 8:
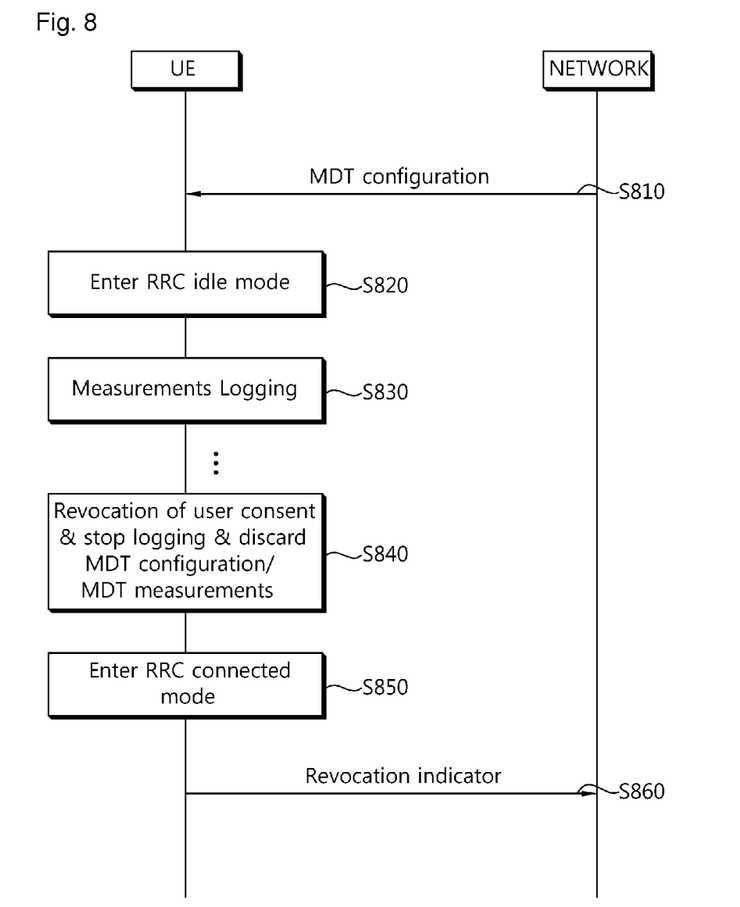
FIG. 8 is a flowchart showing an MDT measurement according to another embodiment of the present invention.

FIG. 8 is a flowchart showing an MDT measurement according to another embodiment of the present invention.

A UE receives an MDT configuration for a logged MDT from a BS (step S810). As the MDT configuration is received, the UE can start a duration timer.

The UE enters an RRC idle mode (step S820). The UE performs measurement logging on the basis of the MDT configuration while the duration timer is running (step S830).

A user of the UE revokes an MDT consent while the logged MDT is performed (step S840). The revocation can be reported by an NAS of the UE to an RRC layer of the UE. When the consent is revoked, the MDT measurement stops, and the duration timer may stop. Then, the MDT configuration and the MDT measurement result are discarded.

According to the conventional technique, even if the UE discards the MDT measurement, the MDT measurement result is maintained for 48 hours. The user may not want to continuously store the MDT measurement result. Therefore, when the user of the UE revokes the consent for performing of MDT, the NAS of the UE reports this fact to an RRC of the UE, and the RRC of the UE discards the MDT configuration and a corresponding measurement result.

The UE re-enters the RRC connected mode (step S850). As the UE re-enters the RRC connected mode, the UE sends a revocation indicator to the BS (step S860). The revoke indicator may indicate a revocation of a user consent. Alternatively, the revocation indicator may indicate a deletion of user's privacy information.

In the above embodiment, when performing the immediate MDT or the logged MDT on the basis of the MDT configuration, the UE can perform it after confirming a user's consent. If the confirmation result shows that the user's consent is revoked, the UE may not store privacy information such as location information into the measurement result.

Meanwhile, the MDT measurement may be a process of reporting a measurement result including the location information of the user. A radio link failure (RLF) report also includes the location information of the user. The RLF implies a state in which the UE is no longer able to maintain a connection with a network due to a reason such as an out-of-sync, a handover failure, etc. When the RLF occurs, the UE stores radio environment information and location information at a corresponding time. Further, when an RRC connection to the BS is established, the UE reports the information to the BS. The RLF report is performed even if no configuration is received from the BS, and reporting of the location information of the UE to the BS may be a violation of user's privacy. Therefore, when the user of the UE revokes an MDT consent, an NAS of the UE may report the revocation to an RRC of the UE, and the RRC of the UE may discard the stored RLF report or may perform the RLF report without the location information.

Figure 9:
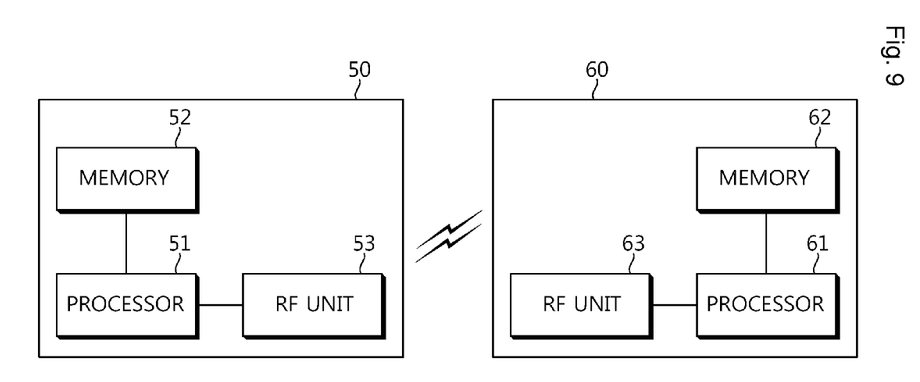
FIG. 9 is a block diagram showing a wireless communication system to implement the embodiments of the present invention.

FIG. 9 is a block diagram showing a wireless communication system to implement the embodiments of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. The processor 51 can implement an operation of the BS according to the embodiments of FIG. 5 to FIG. 8.

A UE 60 includes a processor 61, a memory 62, and an RF unit 63. The memory 62 is coupled to the processor 61, and stores a variety of information for driving the processor 61.

The RF unit 63 is coupled to the processor 61, and transmits and/or receives a radio signal. The processor 61 implements the proposed functions, procedures, and/or methods. The processor 61 can implement an operation of the UE according to the embodiments of FIG. 5 to FIG. 8.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for reporting Minimization of Driving Tests (MDT) measurement results in a wireless communication system, performed by a user equipment (UE), the method comprising:
   receiving an MDT measurement configuration from a base station;
   entering a Radio Resource Control (RRC) idle mode;
   logging an MDT measurement result based on the MDT measurement configuration when the UE is in the RRC idle mode, the MDT measurement result including at least one log entry, the at least one log entry including a measured cell quality of a serving cell, a measured cell quality of a neighbor cell and privacy information of the UE;
   determining whether consent for reporting privacy information is revoked while in the RRC idle mode;
   when consent is revoked while in the RRC idle mode, stop logging the MDT measurement result;
   entering an RRC connected mode;
   transmitting to the base station, upon entering the RRC connected mode, a revocation indicator indicating whether or not consent is revoked,
   wherein the revocation indicator is transmitted using an RRC message; and
   receiving a release message in order to release the MDT measurement configuration when the revocation indicator indicates that consent is revoked,
   wherein the release message includes another measurement configuration including a logging duration which is set to zero such that the MDT measurement is not performed,
   wherein establishment of the RRC connection is not triggered as a result of consent revocation.

2. The method of claim 1, wherein the privacy information includes location information of the UE at the moment of logging.

3. The method of claim 1, wherein the measurement configuration includes a logging interval indicating a periodicity for measurement logging and a logging duration indicating a duration for which UE is requested to perform MDT measurement logging.

4. The method of claim 1, further comprising:
   when the consent is revoked, discarding the MDT measurement configuration.

5. The method of claim 4, further comprising:
   when the consent is revoked, discarding the MDT measurement result.

6. The method of claim 1, wherein the MDT measurement result is logged while the UE is in a RRC idle mode.

7. The method of claim 1, wherein the measurement configuration is used to configure the UE to perform Minimization of driving tests (MDT).

8. A user equipment (UE) for reporting Minimization of Driving Tests (MDT) measurement results in a wireless communication system, comprising:
   a radio frequency unit for receiving a radio signal; and
   a processor, operably coupled with the radio frequency unit, configured to:
   receive an MDT measurement configuration from a base station;
   enter a Radio Resource Control (RRC) idle mode;
   log an MDT measurement result based on the MDT measurement configuration, the MDT measurement result including at least one log entry, the at least one log entry including a measured cell quality of a serving cell, a measured cell quality of a neighbor cell and privacy information of the UE;
   determine whether consent for reporting privacy information is revoked while in the RRC idle mode; and
   when consent is revoked while in the RRC idle mode, stop logging the MDT measurement result,
   enter an RRC connected mode;
   transmit to the base station, upon entering the RRC connected mode, a revocation indicator indicating whether or not consent is revoked,
   wherein the revocation indicator is transmitted by using an RRC message; and
   receive a release message in order to release the MDT measurement configuration when the revocation indicator indicates that the consent is revoked, wherein the release message includes another measurement configuration including a logging duration which is set to zero such that the MDT measurement is not performed,
   wherein establishment of the RRC connection is not triggered as a result of consent revocation.

9. The UE of claim 8, wherein the privacy information includes location information of the UE at the moment of logging.

10. The UE of claim 8, wherein the MDT measurement configuration includes a logging interval indicating a periodicity for MDT measurement logging and a logging duration indicating a duration for which the UE is requested to perform MDT measurement logging.

* * * * *